United States Patent [19]
Picking

[11] Patent Number: 5,860,453
[45] Date of Patent: Jan. 19, 1999

[54] ANNULAR SEPARATORS FOR DOUBLE WALLED PIPE STRUCTURES

[75] Inventor: Kenneth David Picking, Cleveland, England

[73] Assignee: British Steel plc, England

[21] Appl. No.: 945,417

[22] PCT Filed: May 13, 1996

[86] PCT No.: PCT/GB96/01129

§ 371 Date: Oct. 30, 1997

§ 102(e) Date: Oct. 30, 1997

[87] PCT Pub. No.: WO96/36831

PCT Pub. Date: Nov. 21, 1996

[30] Foreign Application Priority Data

May 16, 1995 [GB] United Kingdom ............... 9509861

[51] Int. Cl.[6] ........................................................ F16L 7/18
[52] U.S. Cl. ........................ 138/112; 138/113; 138/108; 138/148
[58] Field of Search ........................... 138/112–114, 111, 138/148, 108, 161; 248/68.1

[56] References Cited

U.S. PATENT DOCUMENTS

| | | | |
|---|---|---|---|
| 3,349,168 | 10/1967 | Rehder et al. | 138/113 X |
| 3,406,748 | 10/1968 | Jarreby | 138/114 X |
| 3,899,007 | 8/1975 | Miller | 138/114 |
| 3,964,754 | 6/1976 | Murai et al. | 138/113 X |
| 4,124,040 | 11/1978 | Miller | 138/114 X |
| 4,569,210 | 2/1986 | Albagnac | 62/514 |
| 5,441,082 | 8/1995 | Eskew et al. | 138/112 |

FOREIGN PATENT DOCUMENTS

| | | |
|---|---|---|
| 0 422 356 | 4/1991 | European Pat. Off. . |
| 0 537 603 | 4/1993 | European Pat. Off. . |
| 0 586 944 | 3/1994 | European Pat. Off. . |
| 3048838 | 7/1982 | Germany ................ 138/113 |

*Primary Examiner*—Patrick F. Brinson
*Attorney, Agent, or Firm*—Bacon & Thomas PLLC

[57] ABSTRACT

An annular bulkhead for separating the inner and outer generally coaxial pipes of a double walled pipe structure wherein the bulkhead is in the form of an annular resilient member dimensioned to fit, in use, the annular space between the pipes, wherein the annular resilient member is supported on each axial side thereof by means of at least partial annular rigid rings divided into separate segments and secured together through the resilient annular member.

7 Claims, 1 Drawing Sheet

ANNULAR SEPARATORS FOR DOUBLE WALLED PIPE STRUCTURES

BACKGROUND OF THE INVENTION

1. Field of the Invention

This invention relates to annular separators for double walled pipe structures.

2. Description of Related Art

It has been proposed for transporting oil and/or gas from off-shore oil wells, to provide a pipeline formed of double walled pipes constructed from an outer and inner pipe of a generally coaxial disposition, the inner pipe being arranged to carry the oil or gas, which will usually be at an elevated temperature relative to ambient conditions, the inner and outer pipes being held apart by separators or bulkheads acting as seals between lengths of the annular space between the pipes, and the annular space between the inner pipe and the outer pipe being filled with hollow microspheres of alumino-silicate, for example, whereby thermally to insulate the oil or gas contained within the inner pipe, increase the strength of the structure and in certain circumstances enable the pipeline structure to float on the water surface. A pipeline formed of such inner and outer pipes can, with appropriate bulkheads between the two along their length, and interconnection to successive pipes by welding for example, act as a single compliant structure capable of being handled as a single pipe.

It has been proposed to use as such bulkheads an annular ring of rubber or similar resilient material of generally rectangular cross-section sandwiched between two supporting steel rings one on each side bolted together through the rubber.

One problem with such a structure is that when the pipeline is bent, such as when it is coiled on to a drum for carriage purposes, it deforms somewhat into an oval section, and the bulkheads can form distortions in the slightly oval bent or coiled pipe structure because of resistance to the oval deformation of the pipe structure.

SUMMARY OF THE INVENTION

It is an object of the present invention to overcome or at least substantially reduce the above mentioned problem.

In accordance with one aspect of the present invention there is provided an annular bulkhead for separating the inner and outer generally coaxial pipes of a double walled pipe structure wherein the bulkhead is in the form of an annular resilient member dimensioned to fit, in use, the annular space between the pipes, wherein the annular resilient member is supported on each axial side thereof by means of at least partial annular rigid rings divided into separate segments and secured together through the resilient annular member.

In one embodiment each rigid ring may be formed of steel, and may be separated into four equal segments around the bulkhead.

The segments of the annular steel rings may be staggered on each side so that separation between segments do not coincide with each other on both sides of the resilient member.

The invention includes within its scope a double walled pipe structure including an annular bulkhead as hereinabove defined separating an inner and an outer pipe.

In order that the invention may be more fully understood one embodiment thereof will now be described by way of example with reference to the accompanying drawings.

BRIEF DESCRIPTION OF THE FIGURES OF DRAWINGS

FIG. 1 illustrates in front elevation a bulkhead for a double walled pipe structure in accordance with the invention; and FIG. 2 is a sectional side elevation of part of a double walled structure showing the disposition of a bulkhead as shown in FIG. 1.

DETAILED DESCRIPTION OF THE PREFERRED EMBODIMENT

Figure 1:
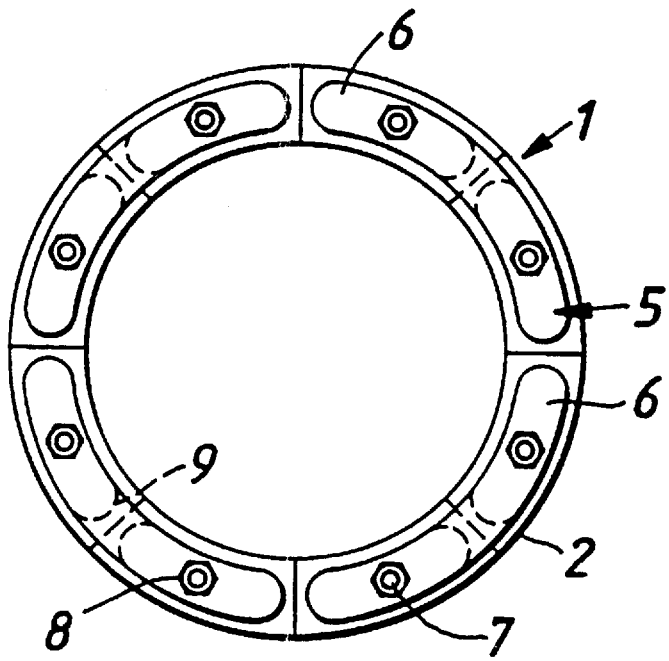
Figure 2:
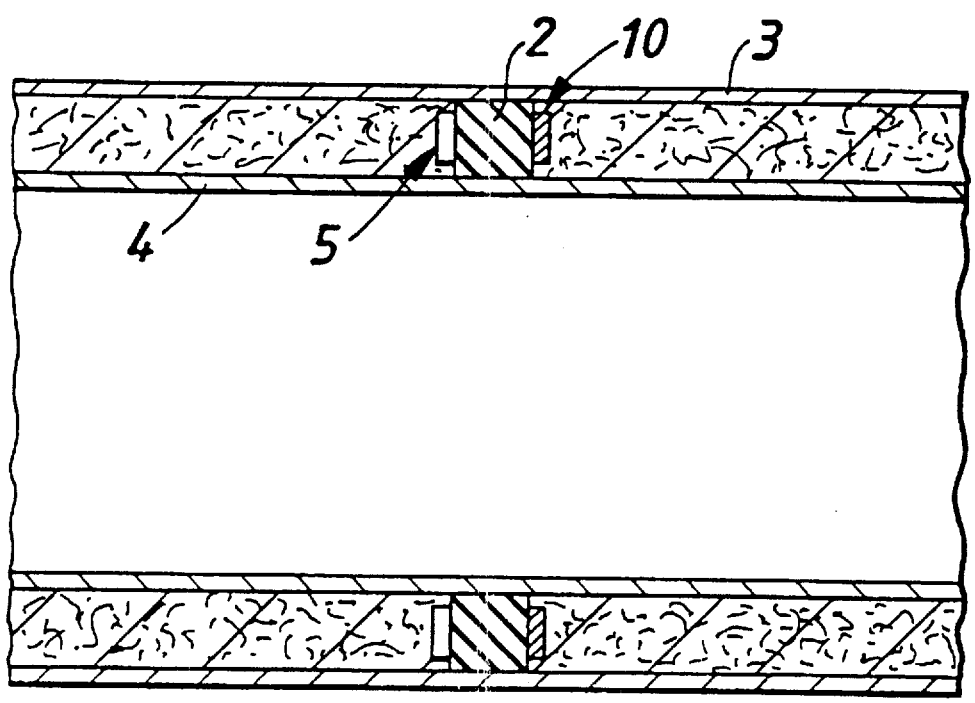

Referring now to the drawings it will be seen that the bulkhead 1 comprises a rubber annular gasket member 2 of rectangular cross-section which fits in sealing fashion between the inner wall of an outer pipe 3, and the outer wall of an inner pipe 4 to separate the two in a generally coaxial disposition.

The resilient rubber sealing gasket 2 is supported on each side by a partially annular steel ring 5 segmented into four pieces 6, each slightly separated from the others and rounded at each end, each piece being connected by means of nuts and bolts 7, 8 to the steel support segment pieces 9 on the other axial side of the gasket member 2.

The segments 6, 9 of each steel ring 5, 10 are staggered with respect to the gasket member such that the gap between two segments on one side of the gasket member axially, corresponds generally with the centre position of a segment on the other side.

We have found that such an arrangement, whilst still providing good support, and hence separation of the inner and outer pipe with good sealing, is nonetheless of such radial flexibility as to be able to deform to an oval configuration corresponding to that taken up by the inner and outer pipes, when the double walled pipe structure is bent, for example when it is disposed about a large transporting drum therefor.

It is to be understood that the foregoing is merely exemplary of bulkheads for double walled pipe structures in accordance with the invention and that modifications can readily be made thereto without departing from the true scope of the invention.

I claim:

1. An annular bulkhead for separating the inner and outer generally coaxial pipes of a double walled pipe structure wherein the bulkhead is in the form of an annular resilient member dimensioned to fit, in use, the annular space between the pipes, wherein the annular resilient member is supported on each axial side thereof by means of at least partial annular rigid rings divided into separate segments and secured together through the resilient annular member.

2. An annular bulkhead as claimed in claim 1 wherein each rigid ring is formed of metal and is separated into a plurality of equal segments around the bulkhead.

3. An annular bulkhead as claimed in claim 1 wherein the rigid ring is of steel and is separated into four equal segments around the bulkhead.

4. An annular bulkhead as claimed in claim 1, wherein the segments of the annular steel rings are staggered on each side so that separations between segments do not coincide with each other on opposite sides of the resilient member.

5. An annular bulkhead as claimed in claim 1 wherein the segments on each side are slightly separated one from the others and are rounded at least each end.

6. An annular bulkhead as claimed in claim 1 wherein the segments on opposite axial sides are secured together by bolts and nuts.

7. A double walled pipe structure including an annular bulkhead as claimed in claim 1.

* * * * *